(12) United States Patent
Fruhauf et al.

(10) Patent No.: US 7,746,763 B2
(45) Date of Patent: Jun. 29, 2010

(54) METHOD FOR TRANSMITTING DATA BY MEANS OF A CARRIER CURRENT

(75) Inventors: Joseph Fruhauf, Bourg-la-Reine (FR); Alexandre Dubois, Paris (FR)

(73) Assignee: Spidcom Technologies (FR)

( * ) Notice: Subject to any disclaimer, the term of this patent is extended or adjusted under 35 U.S.C. 154(b) by 64 days.

(21) Appl. No.: 10/554,848

(22) PCT Filed: Apr. 30, 2004

(86) PCT No.: PCT/FR2004/001057

§ 371 (c)(1),
(2), (4) Date: Aug. 22, 2006

(87) PCT Pub. No.: WO2004/100392

PCT Pub. Date: Nov. 18, 2004

(65) Prior Publication Data

US 2007/0064589 A1   Mar. 22, 2007

(30) Foreign Application Priority Data

Apr. 30, 2003   (FR) .................................. 03 05374

(51) Int. Cl.
*H04J 11/00* (2006.01)
*H04J 3/06* (2006.01)
(52) U.S. Cl. ..................................... 370/208; 370/503
(58) Field of Classification Search ......... 370/203–210, 370/329–330, 503
See application file for complete search history.

(56) References Cited

U.S. PATENT DOCUMENTS

| | | |
|---|---|---|
| 5,610,908 A | 3/1997 | Shelswell et al. |
| 5,684,450 A | 11/1997 | Brown |
| 6,249,213 B1 | 6/2001 | Horne |
| 6,282,405 B1 | 8/2001 | Brown |
| 6,373,377 B1 | 4/2002 | Sacca et al. |
| 6,456,657 B1 | 9/2002 | Yeap et al. |
| 6,473,453 B1 | 10/2002 | Wilkinson |
| 6,618,352 B1 * | 9/2003 | Shirakata et al. ............. 370/203 |
| 7,023,324 B2 * | 4/2006 | Kodama et al. ............. 375/260 |
| 7,092,352 B2 * | 8/2006 | Shattil ......................... 370/210 |
| 7,257,165 B2 * | 8/2007 | Gardner ...................... 375/260 |
| 7,529,177 B2 * | 5/2009 | Celebi et al. ................. 370/208 |
| 2002/0003772 A1 * | 1/2002 | Matsui ........................ 370/206 |

(Continued)

FOREIGN PATENT DOCUMENTS

EP   1 011 235   6/2000

(Continued)

*Primary Examiner*—Kwang B. Yao
*Assistant Examiner*—Candal Elpenord
(74) *Attorney, Agent, or Firm*—Baker & McKenzie LLP

(57) ABSTRACT

The invention relates to a method for transmitting data over a carrier current using a frequency band. According to said method: the frequency band is divided into N sub-bands, N being a whole number higher than, or equal to, two; an OFDM (Orthogonal Frequency Division Multiplexing) technique is carried out on each of said sub-bands; and calculations are carried out based on each sub-band. The inventive method is characterised in that the calculations based on each sub-band are independent from the calculations based on the other sub-bands, and said sub-bands are dynamically activated and allocated. The invention also relates to modulation and demodulation devices for carrying out said method.

8 Claims, 11 Drawing Sheets

U.S. PATENT DOCUMENTS

| | | | |
|---|---|---|---|
| 2002/0010870 A1 | 1/2002 | Gardner | |
| 2002/0196732 A1 | 12/2002 | Mestdagh | |
| 2003/0026295 A1* | 2/2003 | Baum et al. | 370/503 |
| 2003/0133473 A1* | 7/2003 | Manis et al. | 370/480 |
| 2004/0190440 A1* | 9/2004 | Kim et al. | 370/210 |
| 2005/0047367 A1* | 3/2005 | Lakkis | 370/329 |

FOREIGN PATENT DOCUMENTS

| | | |
|---|---|---|
| EP | 1 014 640 | 6/2000 |
| EP | 1 018 826 | 7/2000 |
| WO | WO 96/24995 | 8/1996 |
| WO | WO 01/95518 | 12/2001 |
| WO | WO 02/51089 | 6/2002 |

* cited by examiner

METHOD FOR TRANSMITTING DATA BY MEANS OF A CARRIER CURRENT

The present invention relates to the field of data transmission by carrier current.

The present invention relates more particularly to a method for transmitting data and to a modem implementing the Orthogonal Frequency Division Multiplexing (OFDM) technique.

In the prior art, a communications system that uses OFDM on the carrier current is known from European Patent Application EP 1 011 235 (Nortel). Noise management is added by clipping the incoming signal.

Also in the prior art, a communications system using the OFDM technique is known from European Patent Application No. EP 1 014 640 (Nortel). Solutions are provided for synchronizing between base and slaves. Special symbols are added, and a longer guard time is used.

PCT Patent Application WO 01/95518 (Conexant) proposes a method and apparatus for dual-band modulation in powerline communication network systems, i.e. in carrier-current network systems. That invention implements the OFDM technique and makes it possible to go from one band to the other statically.

European Patent Application EP 1 018 826 (PolyTrax) also proposes a data transmission method for transmitting data on a carrier current. That method uses the OFDM technique. In the invention presented in that document, the signal is improved either by implementing a non-rectangular window on the time signal (one in every two carriers is lost), or by implementing a filter whose coefficients are given.

Also in the prior art, U.S. Pat. No. 5,610,908 (BBC) discloses a system making it possible to reduce the peak-to-mean ratio.

Also in the prior art, U.S. Pat. No. 6,473,453 (British Secretary of State for Defense) discloses a high-frequency communications system that implements a transmission solution comprising eight multiplexed channels. Those eight channels contain frequency-spread signals. That implementation is advantageous for removing interference related to narrow bands.

Also in the prior art, U.S. Pat. No. 5,684,450 (Norweb) discloses an electricity distribution and/or power transmission network using the OFDM technique on the carrier current by implementing filters and an analog portion for injecting a signal greater than 1 MHz. A termination unit is provided for calculating the appropriate impedance.

Also in the prior art, U.S. Pat. No. 6,282,405 (Norweb) discloses a hybrid electricity and telecommunications network that very generally implements the OFDM technique.

Also in the prior art, U.S. Pat. No. 6,456,657 (Bell Canada) discloses a filter bank system that implements the OFDM technique. That system makes it possible to break down a broadband system, to multiplex all of the sub-bands on the channel and to reconstruct the signal on reception.

Also in the prior art, PCT Patent Application WO 02/51089 (Conexant) discloses a system that synchronizes on periodic noise by using OFDM on the carrier current. The object of that invention is to send data symbols between two noise peaks. Also in the prior art, U.S. Pat. No. 6,373,377 discloses a power supply with coupling for transmitting data.

Also in the state of the art, U.S. Pat. No. 6,249,213 (Intel) discloses a "Method for transmitting information over an alternating current power line through a plurality of frequency orthogonal subchannels". In a version of that invention described in that U.S. patent, a frequency channel for transmitting the information is selected, and it is subdivided into a plurality of frequency orthogonal sub-channels. Each frequency orthogonal sub-channel is tested in order to determine a characteristic transmission value which, in turn, is used to determine a transmission bit density for the frequency orthogonal sub-channel. The information is subdivided into a plurality of data sub-blocks. Each data sub-block corresponds to one of the frequency orthogonal channels, and the size of each data sub-block is determined on the basis of the corresponding transmission bit density. The data of each sub-block is modulated for transmission through the corresponding frequency orthogonal sub-channel. Each data sub-block is transmitted approximately simultaneously through the corresponding frequency orthogonal sub-channel.

That U.S. Pat. No. 6,249,213 to Intel does indeed relate to transmitting data over a power line. However, it makes no mention anywhere of the necessary steps of dynamically activating and allocating sub-bands. These steps are very important in the method of the present invention. In addition, the fact that calculations are performed on each of the sub-bands in a manner totally independent from the calculations performed on the other sub-bands does not appear in the prior art either.

An object of the present invention is to remedy the drawbacks of the prior art by subdividing the frequency band into N sub-bands, where N is an integer greater than or equal to two, by performing calculations on each of the sub-bands that are independent from the calculations performed on the other sub-bands, and by activating the sub-bands dynamically using software means. In addition, synchronizing the OFDM symbols is made simple and inexpensive by the use of OFDM symbols of size smaller than 512 carriers.

To this end, in its most general acceptation, the present invention provides a method for transmitting data on a carrier current using a frequency band, the method consisting in:

subdividing said frequency band into N sub-bands, where N is an integer greater than or equal to two;

implementing an Orthogonal Frequency Division Multiplexing (OFDM) technique on each of said sub-bands; and performing calculation operations on each of the sub-bands;

said method being characterized in that:

the calculations performed on each of the sub-bands are independent of the calculations performed on the other sub-bands; and said sub-bands are activated and allocated in dynamic manner.

In a particular implementation, the number N of sub-bands is equal to 7.

In a particular implementation, the OFDM symbols have a size equal to 256 carriers.

In an advantageous variant, the sub-bands are activated and allocated in dynamic manner by software means.

In another variant, the sub-bands are activated and allocated in dynamic manner by hardware means.

The invention also provides modulation and demodulation equipment for implementing the method, comprising filtering means, fast Fourier transform (FFT) calculation means, analog-to-digital converter (ADC) means, amplifier means, and means for activating and allocating the sub-bands.

The invention will be better understood on reading the following description of an implementation of the invention given purely by way of explanation and with reference to the accompanying figures, in which.

The method of the invention is based on the use of a frequency band for transmitting data on a carrier current. A non-limiting example consists in using the 1.6 MHz to 30 MHz band. The principle of the method of the invention is to subdivide the band into a plurality of (two or more) sub-bands that are independent and that are activated dynamically, by using an OFDM technique on each of them.

Transmission over a carrier current uses advanced signal processing techniques by modulating authorized frequencies (e.g. from 1.6 MHz to 30 MHz) on electrical power supply lines by capacitive or inductive coupling. The coupling makes it possible to ensure firstly that the high-frequency (higher than 50 Hz) and low-voltage signals are transposed onto the power lines, and secondly that the high-frequency signals present on the electrical cables are retrieved in the system.

For reception, the modulated signal is retrieved from the power line, it is filtered roughly (1.6 MHz to 30 MHz) and then amplified. It is then digitized so as to be analyzed as a function of the sub-band that it occupies. Each sub-band is processed in the same way one after the other. The signal is synchronized, multiplied so as to remove the frequency errors therefrom, and then put into the frequency domain. There, information is drawn on the variation in the channel so as to correct better the deformation due to the channel, and then demodulation is performed. Finally, the control unit retrieves the information so as to transmit it to the upper layers.

For transmission, the control unit sends the data, sub-band after sub-band. It is then modulated and put into the time domain. The information is then translated onto the sub-band that it is supposed to occupy by the synthesis filter. There, the digital signal is converted into an analog signal, it is filtered in order to remove the components beyond 1.6 MHz to 30 MHz, and then amplified. Finally, the signal is transmitted over the electrical wires by coupling.

Figure 1:
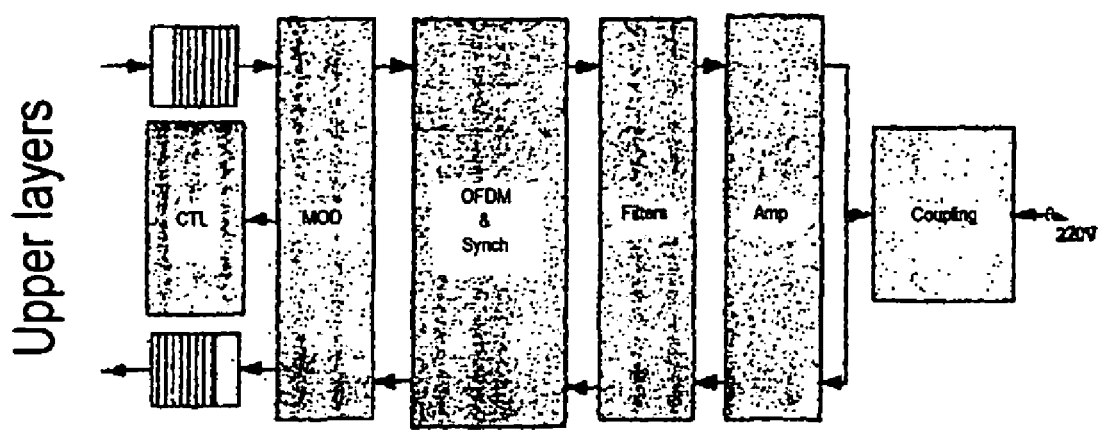
FIG. 1 shows the general principles of the method of the invention.

The transmission and reception chains are quite different and only come together at coupling control, as shown in FIG. 1. They are described in detail below:

Reception—Analog portion. Reception filters the high-frequency signals so as to keep only the working band (1.6 MHz to 30 MHz in our implementation of the invention) using a series capacity for the low frequencies and a low-pass filter. An example of characteristics for the filter is as follows:

8-order elliptical filter;
passband: 0-30 MHz;
stop band at 50 dB down;
passband ripple: <1 dB; and
passband -> stop band transition: <2 MHz.

Reception then amplifies the signal with a variable gain in order to adjust the dynamic range of the signal.

Finally, an analog-to-digital converter makes it possible to digitize the signal.

For example—14 bits and 64 MHz.

Figure 2:
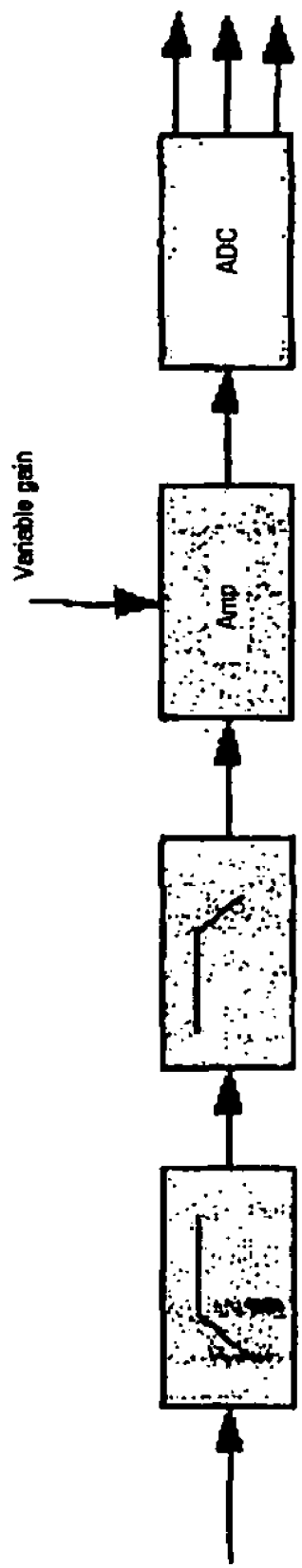
FIG. 2 shows the analog portion of reception.

FIG. 2 describes the analog portion of reception.

Filtering

Figure 3:
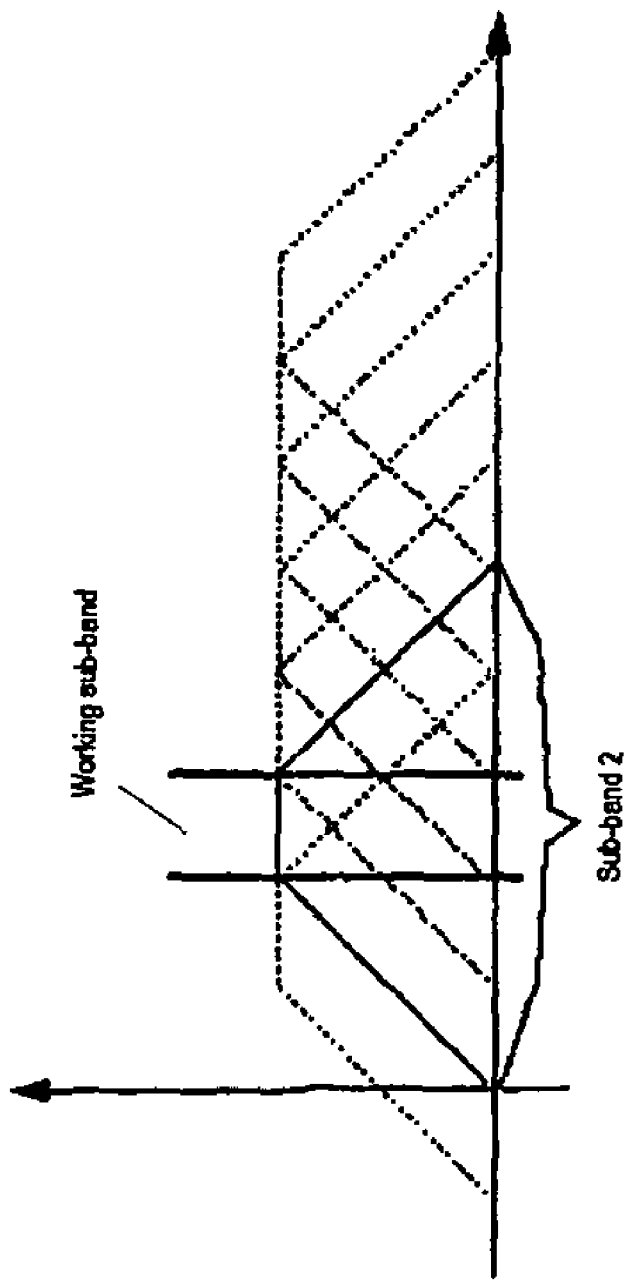
FIG. 3 shows a description of the bands.

The first step in digitally processing the signal is filtering which is at the center of the innovation of the present invention. In this implementation of the invention, seven sub-bands are considered. Naturally, this example is in no way limiting. The filtering makes it possible to retrieve, on 7 different paths, the signals contained in the following 7 sub-bands (TBC):

Sub-band 1: -->10 MHz
Sub-band 2: 2->12 MHz
Sub-band 3: 6->18 MHz
Sub-band 4: 10->22 MHz
Sub-band 5: 14->26 MHz
Sub-band 6: 18->30 MHz
Sub-band 7: 22->34 MHz The filtering is in fact closely linked to the OFDM structure of the signal. Overlapping of the various sub-bands is allowed by assuming that the carriers present in the adjacent sub-bands are not used. This trick makes it possible to reduce the complexity of the filters while also preserving high spectral efficiency. The following are the working frequencies in each of the sub-bands:

Sub-band 1: 2->6 MHz
Sub-band 2: 6->10 MHz
Sub-band 3: 10->14 MHz
Sub-band 4: 14->18 MHz
Sub-band 5: 18->22 MHz
Sub-band 6: 22->26 MHz
Sub-band 7: 26->30 MHz FIG. 3 shows the various bands.

Filtering takes place by means of a bank of analysis filters. This structure makes it possible to isolate the signals from each of the 7 sub-bands and to transpose them into baseband. Eight samples of the overall band make it possible to have one sample per sub-band. They are time-division multiplexed at the outlet of the filter.

Figure 4:
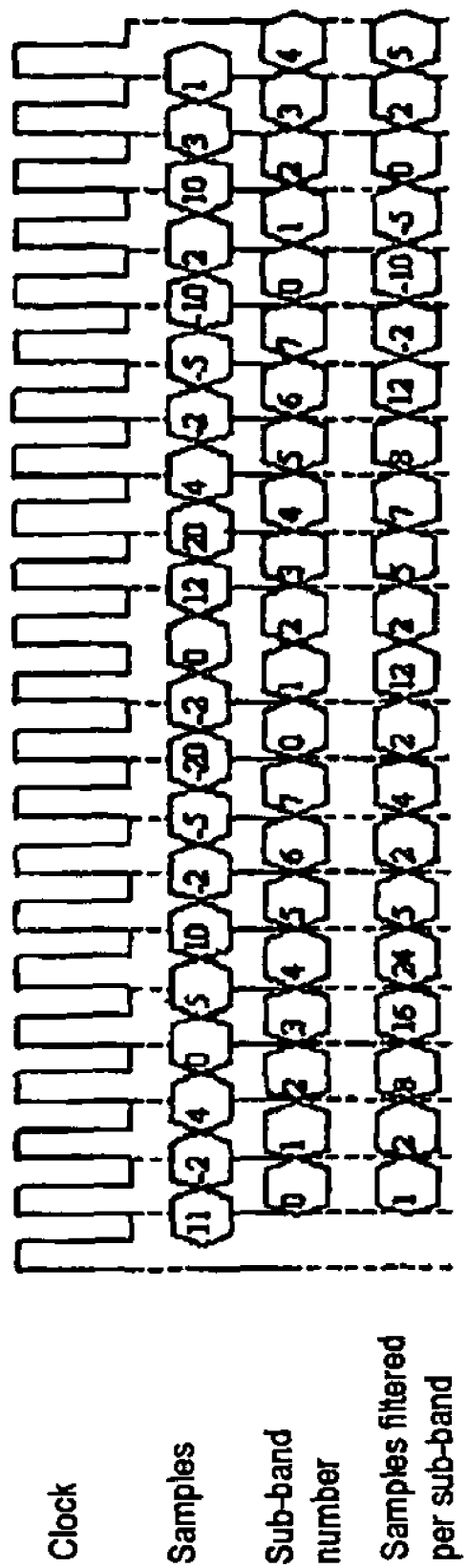
FIG. 4 shows the behavior of the bank of the analysis filter.

FIG. 4 shows the behavior of the analysis filter bank.

Synchronization

Synchronization between a transmitter and a receiver takes place independently on each band. The samples are thus processed and stored one after another as a function of the sub-band concerned by each of them. The synchronization is based on detecting a self-correlated symbol and a guard interval. It makes it possible to place the window of the Fourier transform to go into the frequency domain.

Figure 5:
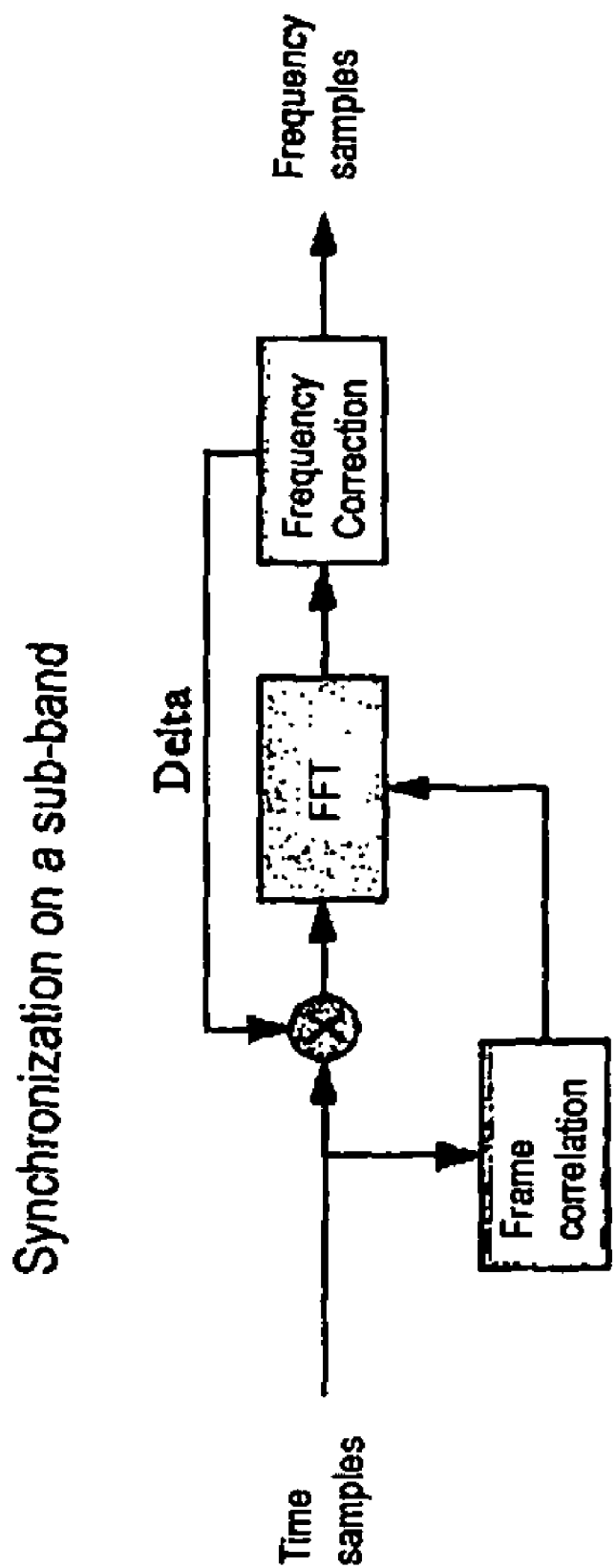
FIG. 5 shows a synchronization flow on a sub-band.

FIG. 5 shows the synchronization flow on a sub-band.

The synchronization symbol is sent at the beginning of the frame. It contains information that is known and repeated over time. Correlation over one half of the symbol makes it possible to identify that symbol from among the other symbols. Then, at the end of the symbol, the guard interval is used that is the recopy of the beginning of the symbol. Correlation over the length of the guard time makes it possible to find the window of the Fourier transform with precision.

Figure 6:
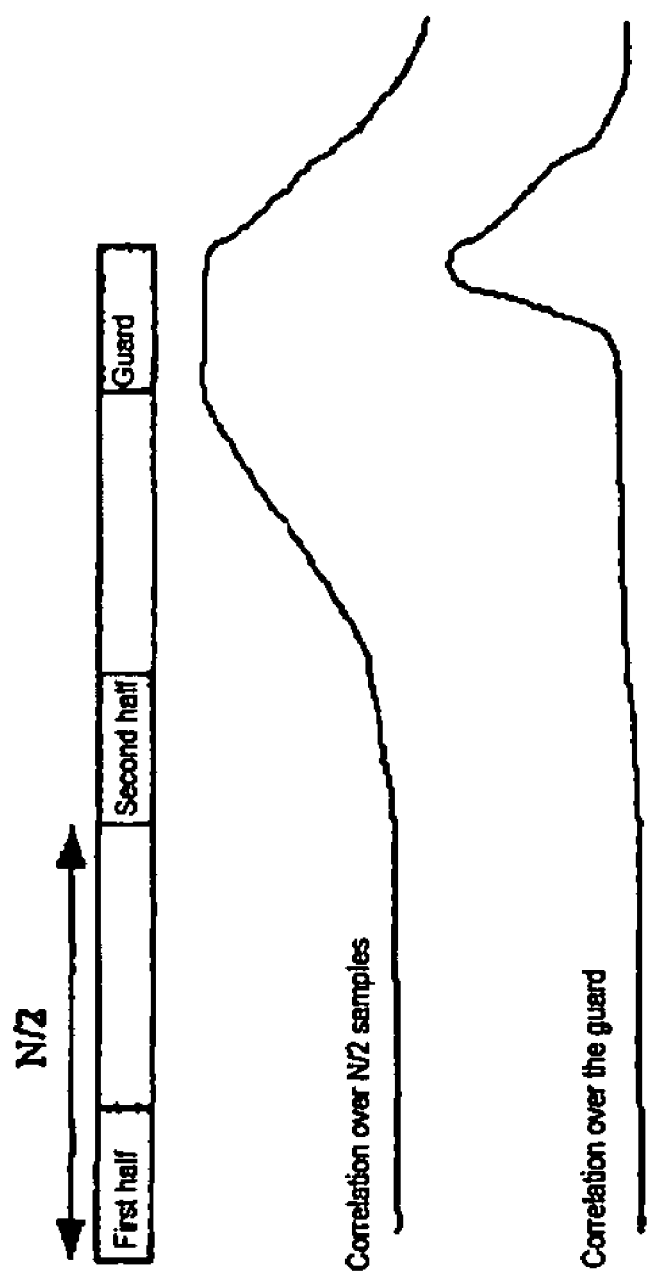
FIG. 6 shows the principle of correlating the frame symbol.

FIG. 6 shows the principle of correlating the frame symbol.

Once an integer symbol is received and detected, the synchronization unit sends it to the Fourier transform after complex multiplication. This makes it possible to correct a time signal on the basis of the calculations performed further downstream in the reception chain. At the beginning of the frame, the correction is inactive.

From this stage on, the samples in the various sub-bands are dissociated. The sub-bands are processed one after another, 256 samples by 256.

Figure 7:
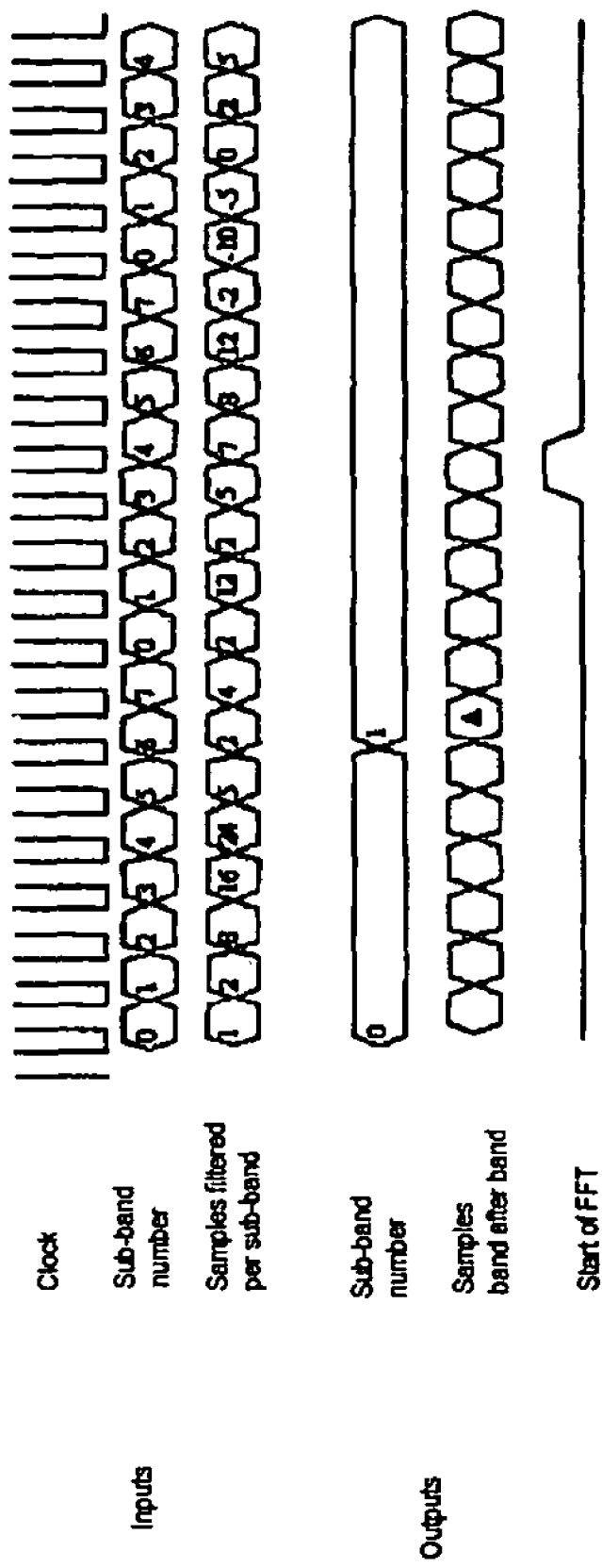
FIG. 7 shows the behavior of the synchronization block.

FIG. 7 shows the behavior of the synchronization unit.

Fourier Transform

In a preferred implementation, the OFDM signal in each of the sub-bands is made up of 256 carriers. Even if only 128 carriers are used in order to comply with the structure of the sub-bands, it is necessary to perform a Fourier transform of 256 points. For 256 time samples received in a sub-band, it calculates 256 frequency samples corresponding to the 256 carriers.

The structure used is relatively conventional, based on the principle of the butterfly. For 256 points including 128 non-zero points, this structure has been particularly optimized in terms of area and of speed. It makes it possible to perform the calculation with latency of about 256 cycles.

Frequency Correction

Electrical current, like most communications media, generates errors on the frequencies that are used. There can be amplitude and phase errors, with both amplitude and phase drifting over time. In order to correct them, the solution of the present invention is based on the use of two tools: a reference symbol that is entirely known, that contains all of the carriers used, and that is sent at regular intervals; and reference carriers (pilots) in each data symbol. Their locations are known to the transmitter and to the receiver.

On a reference symbol, the phase and amplitude correction is estimated for all of the carriers.

Figure 8:
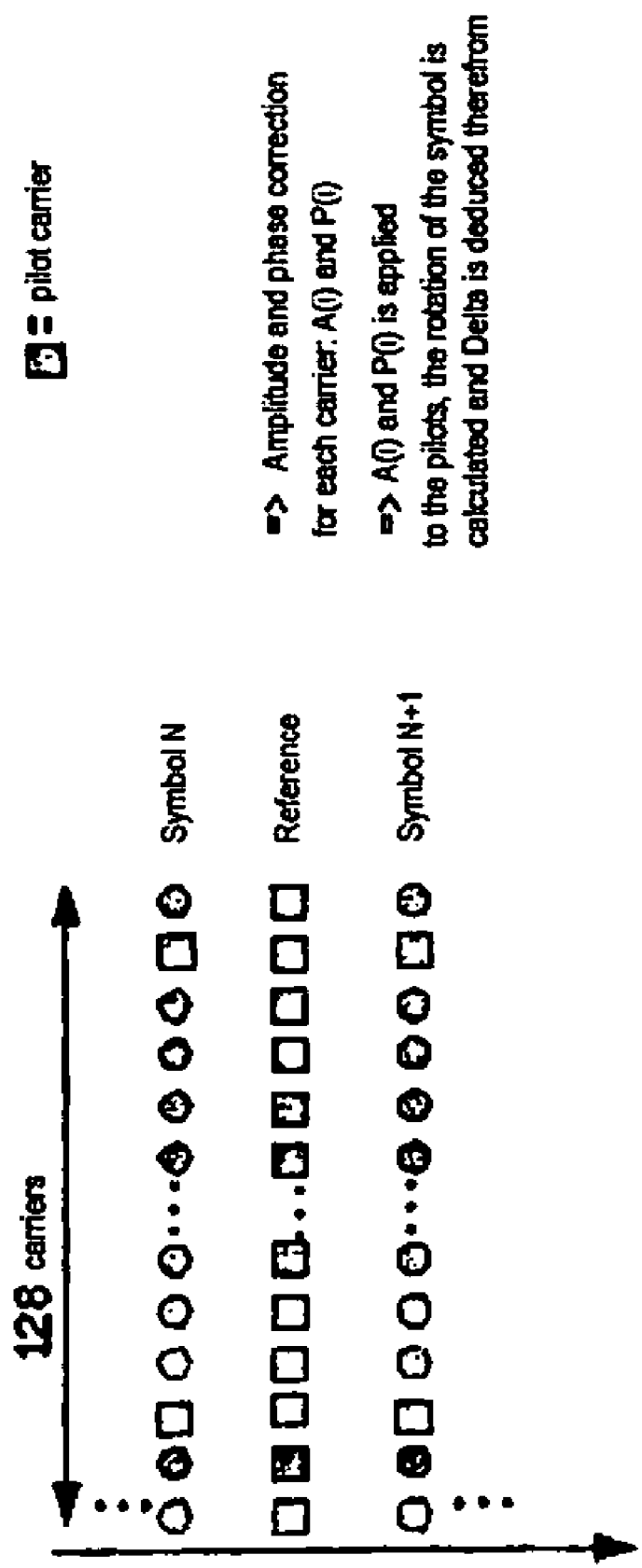
FIG. 8 show the principle of equalizing and of correcting the frequency error.

The values found above are applied to the following symbols, and the pilot carriers are examined. The angle of rotation is calculated for the two pilot carriers, and the angle of rotation for all of the other carriers is deduced therefrom by linear regression. The angle of rotation of the middle carrier is referred to as Delta, and that angle is applied to the following symbol in the time domain. FIG. 5 shows the synchronization flow on a sub-band, and FIG. 8 shows the principle of equalizing and of correcting the frequency error.

Demodulation

With the carriers having finally been corrected, it is possible to demodulate them. For this purpose, the transmitter and the receiver have agreed to use specific modulations for each of the 16 groups of 8 carriers per sub-band. On each of these groups, it is possible to use a modulation adapted to the noise level:

0—no modulation;
1—binary phase-shift keying (BPSK);
2—quaternary phase-shift keying (QPSK);
4—16-level quadrature amplitude modulation (16-QAM);
6—64-level quadrature amplitude modulation (64-QAM); and
8—256-level quadrature amplitude modulation (256-QAM).

The reference symbols and the pilot carriers are not demodulated. In addition, on each of the sub-bands, certain carriers are forbidden because they are used by other priority services. They are not demodulated.

The demodulator is capable of calculating the signal-to-noise ratio on each of the carriers. This is achieved by demodulating the carrier on the basis of the values of the channel, by re-modulating to find the expected ideal values, and by calculating the difference.

Figure 9:
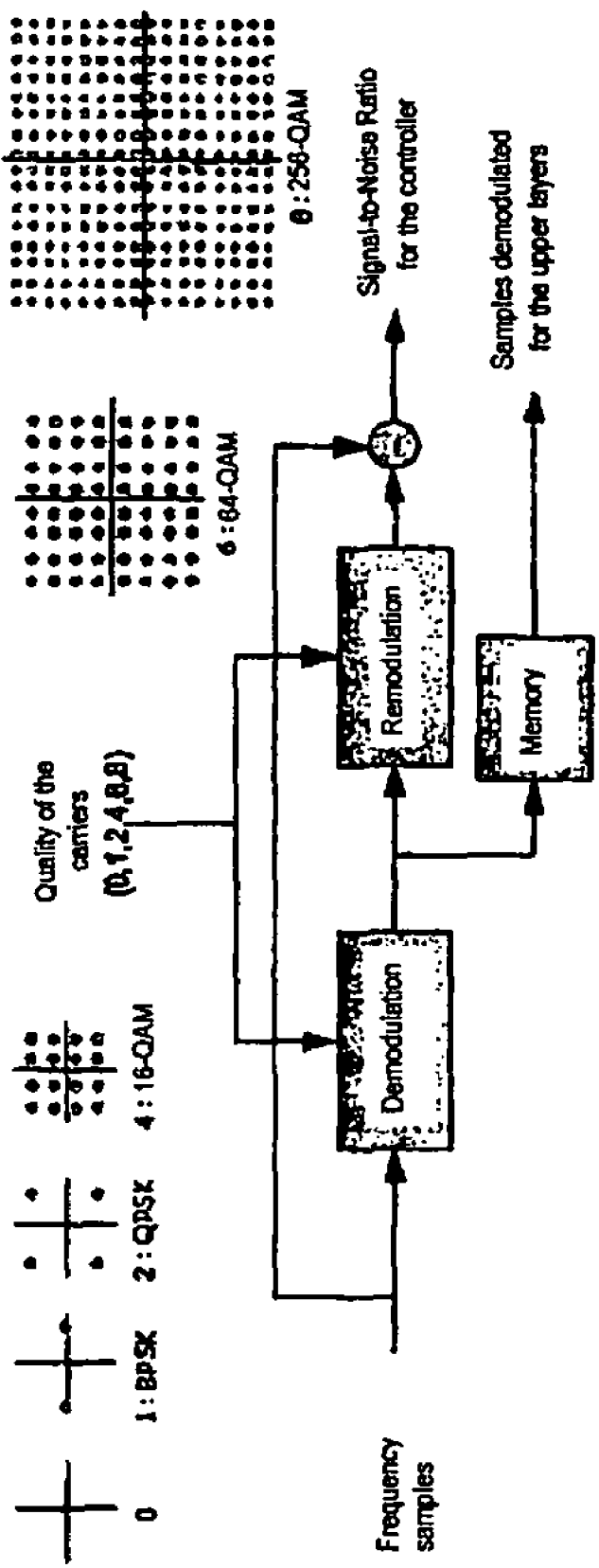
FIG. 9 shows the demodulation flow on a sub-band.

FIG. 9 shows the demodulation flow on a sub-band. All of the demodulated values are stored, and the demodulation information is transmitted to the controller. All of the signal-to-noise ratio information is transmitted to the controller.

Control

The solution for transmitting over the carrier current is controlled in a microprocessor which controls the modulator directly for transmission and which controls the demodulator directly for reception. The microcontroller processes the various sub-bands one after another. As a function of its own software configuration (on-board program loaded dynamically), it activates or does not activate the sub-bands and allocates to them the various data streams.

It does not manage the data as such, but rather it receives information on availability of the data and controls the modulator and the demodulator accordingly. In the same way, it informs the upper layers (error-correcting encoding, media access control (MAC) layer, etc.) that an item of data has been sent or received.

In addition, the controller is sole master of the modulations applied to each carrier and of the signal-to-noise ratio calculated. It is the controller that takes the decision to change the modulation.

Transmission—Modulation

The modulator is the alter ego of the demodulator: similar features are to be found in it. It modulates the data that is stored, on the command of the controller. The data can be modulated by 0, 1, 2, 4, 6, or 8 as a function of quality. On each of the carriers, it is possible to prohibit modulation to comply with forbidden frequencies (concept of notches). On two pilot carriers in a symbol, it is possible to force the modulation with a known item of data.

Figure 10:
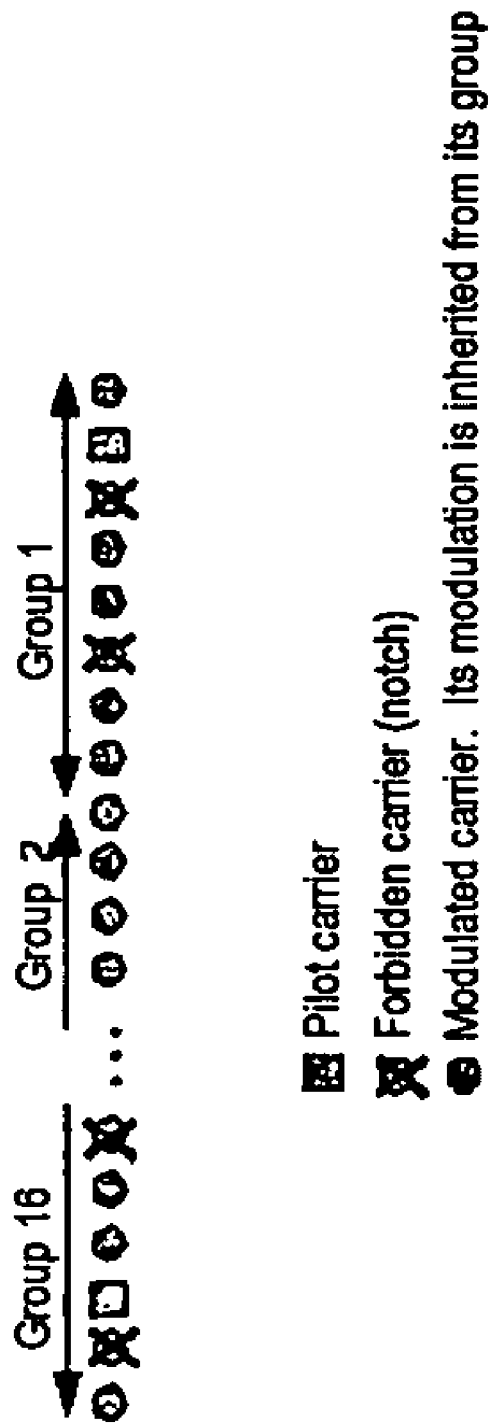
FIG. 10 shows the modulation configuration on a sub-band.

FIG. 10 shows the configuration of the modulation on a sub-band.

In order to limit information transmission, only the 128 active carriers in each of the sub-bands are transmitted. It is downstream (in particular in the inverse Fourier transform) that the 128 zero other carriers are added and that the 256 points per sub-band are constructed.

Multiplication

The modulator needs only 6 bits of dynamic range for modulation. The frequency element of each carrier is multiplied by a complex number and the dynamic range is then 14 bits. The complex number used for the multiplication can be broken down into:

an amplitude for adapting as well as possible to the electromagnetic constraints; and
a phase for avoiding saturating the downstream calculation.

Inverse Fourier Transform

This step makes it possible to construct a time signal of 256 points on the basis of 128 working frequency elements.

Synthesis Filter

The synthesis filter makes it possible to translate the various items of data corresponding to the various sub-bands into the associated frequency bands. The structure used is the dual of the analysis filter used for reception: the data arrives in blocks of 256 time samples, sub-band after sub-band. After the 256 symbols, a guard interval of 32 time samples is added. The data of each of the sub-bands is output interlaced.

Analog Portion

Transmission begins by converting the digital signal into an analog signal.

At the outlet of the converter, the signal is filtered in order to remove the effects of the sampling frequency and in order to generate interference outside the band allocated to transmission on the carrier current. The characteristics of the filter are as follows:

8-order elliptical filter;
passband: 0-30 MHz;
stop band at 50 dB down;
passband ripple: <1 dB; and
passband->stop band transition: <2 MHz.

Then, the signal is amplified prior to coupling. The amplification is fixed (gain 2).

Figure 11:
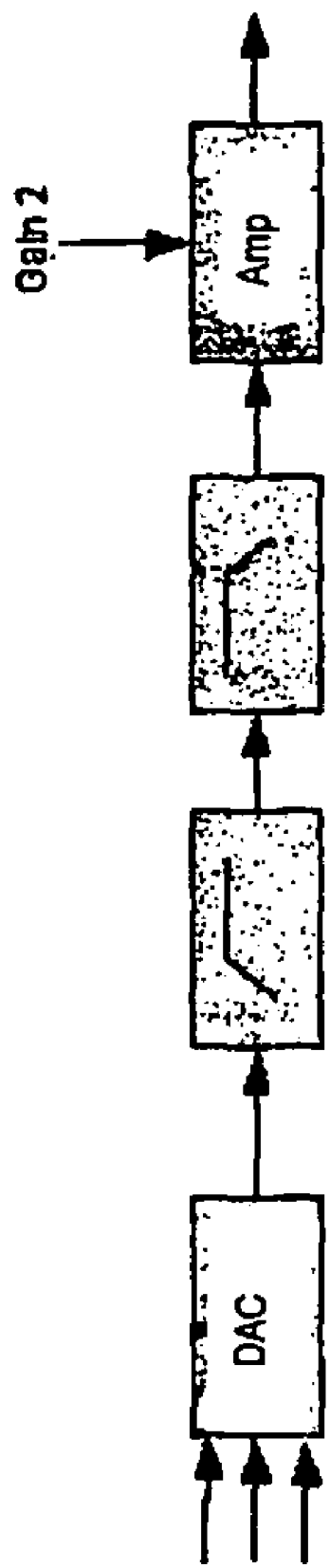
FIG. 11 shows the analog portion of transmission.

FIG. 11 describes the analog portion of transmission.

The invention is described above by way of example. Naturally, a person skilled in the art can devise various variants of the invention without going beyond the ambit of the patent.

The invention claimed is:

1. A method for transmitting data on a carrier current using a frequency band, the method comprising:
    subdividing said frequency band into N sub-bands, where N is an integer greater than or equal to two;
    implementing an Orthogonal Frequency Division Multiplexing (OFDM) technique on each of said sub-bands, said sub-bands being activated and allocated in dynamic manner; and
    performing calculation operations on each of the sub-bands;
    wherein the calculations performed on each of the sub-bands are independent of the calculations performed on the other sub-bands;
    wherein said subdividing of said frequency band comprises using a bank of filters suitable for subdividing said frequency band into N sub-bands;
    wherein said performing of calculation operations comprises synchronization that is carried out independently starting from each these sub-bands; and
    wherein said synchronization includes performing a Fourier transform of a first time sample to produce a first frequency sample, calculating a first angle of rotation for a first pilot carrier, calculating a second angle of rotation for a second pilot carrier, deducing a third angle of rotation for a middle carrier of the first frequency sample, and providing the third angle of rotation for a second time sample prior to performing a Fourier transform of the second sample, the second time sample being subsequent to the first time sample.

2. A method for transmitting data on a carrier current according to claim 1, characterized in that the filters of said bank have filtered sub-bands that overlap.

3. A method for transmitting data on a carrier current according to claim 2, characterized in that the frequencies present in said overlaps are not used.

4. A method for transmitting data on a carrier current according to claim 1, characterized in that the number N of sub-bands is equal to 7.

5. A method for transmitting data on a carrier current according to claim 1, characterized in that the OFDM symbols have a size equal to 256 carriers.

6. A method for transmitting data on a carrier current according to claim 1 characterized in that the sub-bands are activated and allocated in dynamic manner by a non-transitory computer readable medium encoded with computer executable instructions.

7. A method for transmitting data on a carrier current according to claim 1, characterized in that the sub-bands are activated and allocated in dynamic manner by hardware means.

8. Modulation and demodulation equipment for implementing the method according to claim 1, comprising filtering means, fast Fourier transform (FFT) calculation means, analog-to-digital converter (ADC) means, amplifier means, means for activating and allocating the sub-bands, and means for synchronization.

* * * * *